R. M. LAFFERTY.
Assignor to Smith & Lafferty.
PUMP-VALVE.
No. 7,676.
Reissued May 15, 1877.
Fig 1.
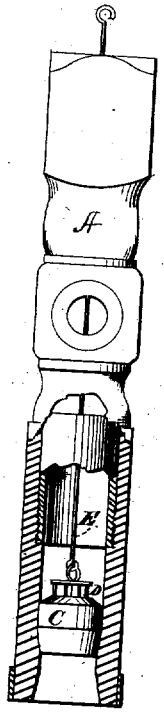
Fig 2. C
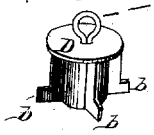
Fig 3.
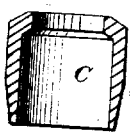
Witnesses.
H. C. Clark
P. Dwyer
Inventor
Robert M. Lafferty.
by Dyer, Reade & Co.
Attys.
N. PETERS, PHOTO-LITHOGRAPHER, WASHINGTON, D. C.

UNITED STATES PATENT OFFICE.

ROBERT M. LAFFERTY, OF TOLEDO, OHIO, ASSIGNOR TO SMITH & LAFFERTY.

IMPROVEMENT IN PUMP-VALVES.

Specification forming part of Letters Patent No. 127,173, dated May 28, 1872; reissue No. 7,676, dated May 15, 1877; application filed February 8, 1873.

DIVISION A.

*To all whom it may concern:*

Be it known that I, ROBERT M. LAFFERTY, of Toledo, in the county of Lucas and State of Ohio, have invented a new and useful Improvement in Wood Pumps; and I do hereby declare that the following is a true and accurate description thereof, reference being had to the accompanying drawing, forming a part of this specification.

The nature of this invention relates to certain improvements in the construction of wood pumps, having for its object to afford a means for readily removing the check-valve and its chamber or case from the pump-stock, without lifting with them the superposed column of water; and the invention consists in the peculiar construction and arrangement of the check-valve, and its case or chamber to effect this purpose.

In the drawings, Figure 1 is an elevation of a pump-stock, with the lower part in section, having my improved valve applied thereto; Fig. 2, a perspective view of the valve detached; and Fig. 3, a cross-section of the valve-chamber or case.

A represents the stock of a wood pump; and C a metallic valve case and seat, tapered at its lower end and inserted from the top into the pump-stock, it being arrested by a contraction in the bore of the said stock. D is the valve, having wings *b* hooked or flared outwardly at their lower ends, for the purpose of guiding the valve in its movement in the enlarged part of the case C, and preventing it from being withdrawn entirely from such case. An eyebolt, *c*, is screwed into the top of the valve, securing the valve-disk to its body.

As it frequently becomes necessary to remove the valve and case of pumps of this class, for the purpose of removing obstructions and grinding them when they have become leaky, by removing the piston a rod, E, having a hook turned on its lower end, is inserted from the top of the pump, and, hooking it into the eyebolt *c*, the valve and its case may be readily withdrawn. As soon as the valve has been lifted from its seat the stock is emptied of the column of water contained therein, thereby obviating the labor of lifting said column of water with the valve and seat, when it is desired to remove them from the pump.

I am aware that a check-valve seat has been heretofore provided with a bail, in which a rod might be hooked, for the purpose of withdrawing it and the valve from the pump; but when such an arrangement was provided in a deep-well pump it involved the expenditure of a great deal of power, owing to the great weight of the column of water which had to be lifted with the valve, in many instances necessitating special means to accomplish the end.

What I claim as my invention, and desire to secure by Letters Patent, is—

The construction and arrangement of valve D, provided with the hooks *b* at the lower ends of its wings, and an eyebolt, *c*, at its top, in combination with the valve-case C, substantially as and for the purpose set forth.

ROBERT M. LAFFERTY.

Witnesses:
H. S. SPRAGUE,
CHAS. E. HEUSTIS.